United States Patent Office 2,837,111
Patented June 3, 1958

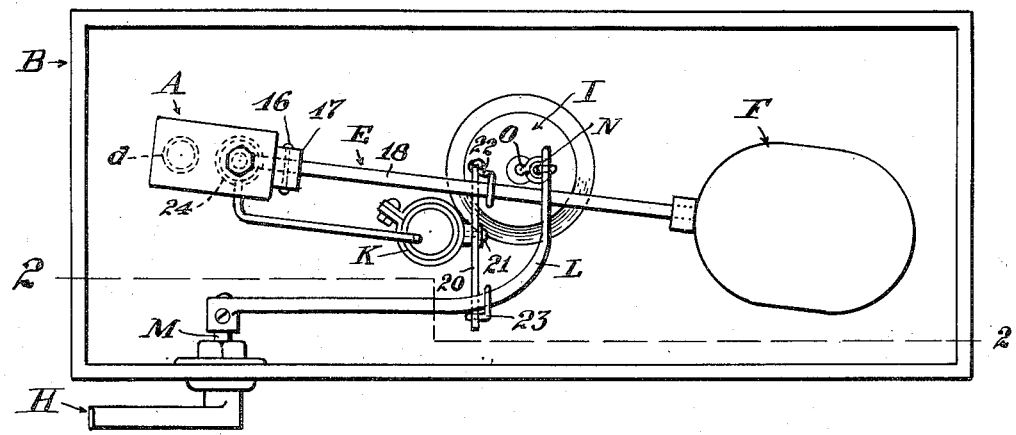

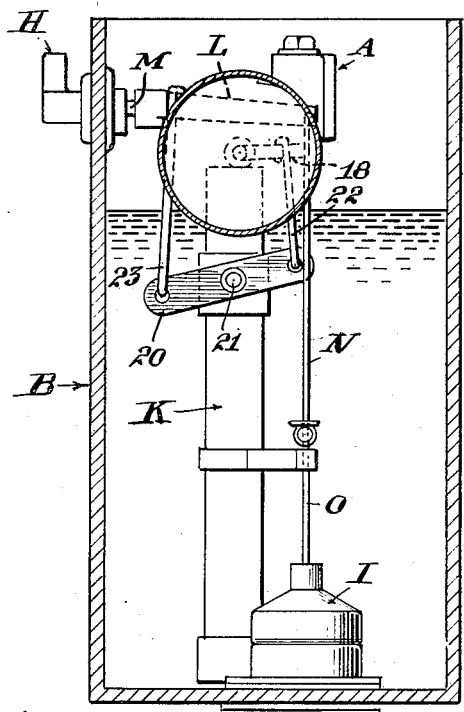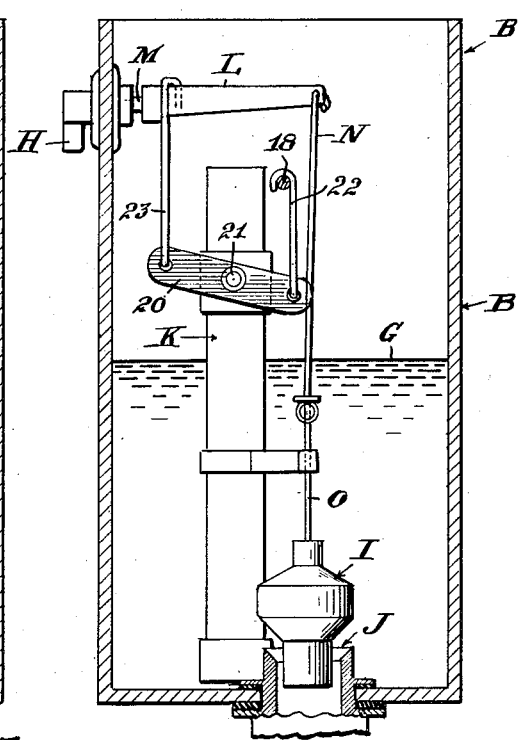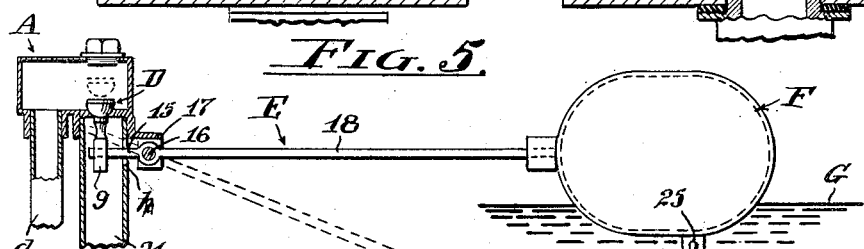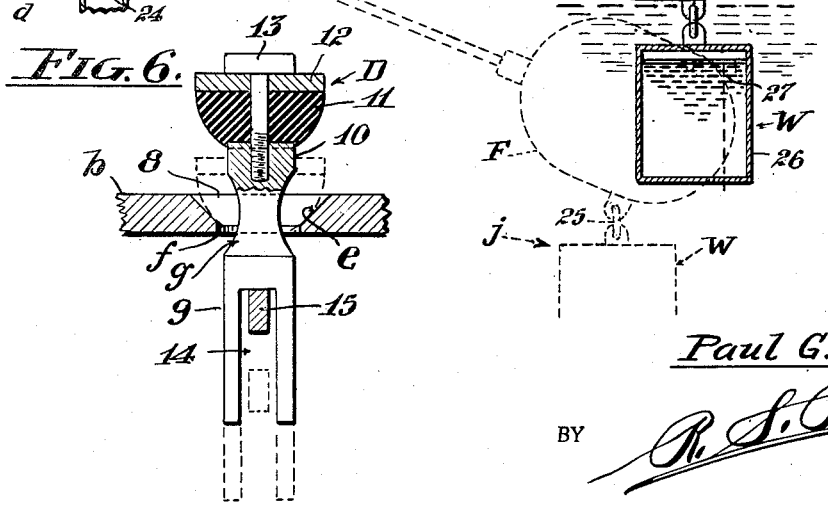

2,837,111

BALL COCK VALVE MECHANISM

Paul G. Mueller, Los Angeles, Calif.

Application January 6, 1955, Serial No. 480,158

5 Claims. (Cl. 137—410)

This invention relates to a ball cock for flush tanks of the type employed in flushing of toilet bowls and the like which embodies a float controlled valve adapted to be opened by lowering of the float and to be closed when the float is elevated by water in a tank when a predetermined water level is reached. Such flush tank valves as now commonly used are closed against the pressure of water from a source of supply which pressure opposes the movement of the float under rising water level in the tank. This results in a slow or delayed movement of the valve preliminary to its reaching its fully closed position and accordingly develops an objectionable hissing sound due to the discharge of water through the then slightly open valve under full water pressure; this delayed action continuing until the slowed delivery of water to the tank finally raises the water level to a point where the float will be effective in fully closing the valve. This action of the conventional float controlled valves frequently gives rise to a condition where full closing of the valve does not occur with a consequent continuous leakage of water through the valve with a resulting waste of water.

One of the purposes of the present invention is to provide a float controlled valve which opens against the pressure of water from a source of supply and which consequently closes in the direction of flow therethrough and is normally maintained closed under the urge of the water pressure, and which is therefore quick closing and silent in its operation.

Another object is to provide a poppet valve which is adapted to be opened and closed under the control of the float and in which the parts are so arranged that opening of the valve will be made in opposition to liquid pressure imposed on the valve and in which such opening of the valve will be effected by downward movement of the float and in which closing of the valve is controlled by lifting of the float but is accomplished by a joint action of the float and the liquid pressure imposed on the valve; the float acting on upward movement thereof to initially move the poppet valve toward its closed position and the pressure of the liquid on the valve acting to complete closing of the valve and to maintain it in its closed position.

Another object of the invention is to provide a construction of float controlled poppet type valves in which sudden opening and sudden closing of the valve under float control will be effected in a manner to insure immediate delivery of maximum capacity of liquid through the valve on opening thereof and to quickly cut off flow of liquid through the valve on closing thereof so as to obviate the hissing noise and wear of valve seat incident to prolonged closing of the valve as commonly occurs in the operation of poppet valves which close against the pressure of liquid flowing through the valve.

Another object is to provide a highly effective and efficient liquid cut-off in a valve which will form a positive seal precluding leakage through the valve for a considerable length of time and usage, and which in event of leakage due to wear, replacement of worn parts may be readily and economically effected.

Another object is to provide a ball-cock for flush tanks of extremely simple construction and a few parts which may be easily fabricated and readily assembled and which may be readily installed in the conventional toilet flush tank.

A further object is to provide a flush controlled valve or ball cock of the above character with a supplemental weight associated with a float, which weight is sufficiently buoyant as to exert little or no downward pull on the float when submerged but which when un-submerged or partly so will exert such downward pull on the float as to cooperate with the weight of the latter in overcoming water pressure on a closed poppet valve and thereby effect opening of the valve in opposition to the water pressure imposed thereon.

With the foregoing objects in view together with such other objects and advantages as may subsequently appear, the invention resides in the parts and in the combination, construction and arrangement of parts hereinafter described and claimed, and illustrated by way of example in the accompanying drawings, in which:

Fig. 1 is a plan view of a preferred embodiment of the invention;

Fig. 2 is a view in section and elevation taken on the line 2—2 of Fig. 1 illustrating the valve and its associated float; showing the valve in its closed position;

Fig. 3 is a view in cross section and elevation as seen on the line 3—3 of Fig. 1 showing the tank flushing mechanism in its closed position;

Fig. 4 is a view in section and elevation taken on the line 4—4 of Fig. 2 showing the tank flushing mechanism in its open position;

Fig. 5 is a view in side elevation showing the valve structure with its float controlling means as embodying a weight and showing the valve operating parts in the valve opening position in full lines and in the closing position in dotted lines; and Fig. 6 is a diagram in section partly in elevation of the valve structure as seen on the line 6—6 of Fig. 2.

Referring to the drawings more specifically A indicates generally a valve housing which encompasses a chamber $a$ and is formed in its bottom wall $b$ with an inlet opening $c$ adapted to receive and be secured to the upper end of a water supply pipe $d$ leading from a suitable source of water supply under pressure, such as that of a water distributing system; the pipe $d$ being arranged within a flush tank B and being fitted with a control valve C exteriorally of the tank. Formed in the bottom wall $b$ of the valve housing is a circular outlet opening 8 the inner margin of which is beveled and constitutes a valve seat $e$.

Arranged in the chamber $a$ of the valve housing A is a valve element D of the poppet type embodying a stem 9 which extends through the outlet opening 8 and is provided with a cylindrical head 10 on its inner end which is of a general diameter slightly less than that of the outlet opening 8 so as to afford a clearance between the head 10 and the wall $f$ surrounding the opening 8. The portion of the stem 9 surrounded by the wall $f$ when the valve element is in its upper fully open position is reduced by forming a concave channel $g$ therearound which channel affords a clearance between the stem and the margin of the outlet opening when the valve element is in its open position as shown in Fig. 6.

The head 10 of the valve stem 9 is fitted with a resilient sealing ring 11 which is in the form of a disk having a rounded lower margin adapted to abut the valve seat $e$ in sealing engagement therewith; the sealing ring being held in place on the head of the valve stem by a clamping plate 12 which seats on the ring 11 and is fastened to the valve stem by a screw 13 the shank of which passes through the plate 12 and ring 11 and has threaded engagement with the valve head 10.

The lower end portion of the valve stem 9 is formed with a slot 14 through which loosely extends the short arm 15 of a lever E fulcrumed on a pivot 16 carried on a hanger 17 affixed to the valve housing A. The long arm 18 of the lever E is fitted with a float F which also serves as a weight and constitutes an actuator controlling the opening and closing of the valve element D under the influence of variations in the level of the body of water G in the tank B on which the float F is adapted to be buoyantly supported and also through manually operable means for depressing the arm 18 as will be later described.

Manifestly the weight of the float F and the relative lengths of the lever arms 15 and 18 could be such as to automatically effect opening of the valve element D in opposition to liquid pressure in the valve housing A when the level of the water G is lowered sufficiently to allow the float to move down such distance that the short arm 15 of the lever will move upwardly and lift the valve element to its open position. However such an arrangement is objectionable since it results in vibrating or chattering of the valve as it closes and accordingly in carrying out the present invention to enable the use of the upwardly opening poppet valve as above described provision is made whereby the float arm 18 may be initially moved downward by manual operation in opposition to the upward thrust of the float F. This is accomplished by effecting a connection between the arm 18 and a hand lever H with which the tank B is ordinarily equipped as a means for elevating a tank-ball I initially opening a tank draining outlet J in the bottom of the tank and through which the water content of the tank is discharged in flushing a toilet bowl in the well known manner; the ball I constituting a valve which normally closes the outlet J by seating on the rim of the latter under the urge of pressure of the water in the tank.

This connection is here shown as embodying a lever 20 pivoted intermediate its ends on a pivot pin 21 carried on an upstanding overflow pipe K connecting with the outlet J, one end of which lever is connected to the arm 18 by a link 22 and the other end of which is connected by a link 23 to an arm L affixed to a rock shaft M journalled on and extending through a wall of the tank and to the end of which the lever H is attached; the arm L extending horizontally from the inner end of the rock shaft and having its outer end connected by a depending link N to the upper end of an upstanding stem O affixed at its lower end to the tank ball I, whereby on operating the lever H to rock the shaft M so as to elevate the arm L the tank ball I will be unseated to open the tank outlet J thereby effecting the desired flushing action.

A discharge pipe 24 connects with the bottom wall b of the housing A in communication with the outlet opening 8 which pipe opens to the tank B adjacent the bottom thereof in the conventional fashion. The pipe 24 is formed with a slot h adjacent the upper end thereof through which the short arm 15 of the lever E extends, which slot affords a communication between the interior of the pipe 24 and the interior of the tank above the water level G so as to prevent formation of a vacuum in the pipe 24 and consequent siphoning of water from the tank in event of back flow of water in the supply pipe d.

In the operation of the invention, when the level of the water G in the flush tank B is below that at which the float F will be supported thereon, and where the weight of the float exerts a downward pull on the arm 18 of the lever E, the latter swings downwardly to the position shown in dotted lines in Fig. 2 so as to hold the valve element D open in opposition to water pressure within the chamber a of the valve housing A; the valve element then being positioned as shown in full lines in Fig. 6 so that water will flow under pressure from the valve housing through the outlet opening 8 and around the channel portion g of the valve stem 9 and through the pipe 24 to discharge in the tank B. When the flow of water from the flush tank is terminated by closing of the tank ball I, water delivered from the valve housing A through the pipe 24 into the tank B raises the level of the water 26 in the tank until the float F is supported on and moved upwardly by the rising water level sufficiently to move the valve element D to substantially its closed position or to a point where the velocity head of water within the valve housing A imposed on the upper end of the valve element will suddenly snap the valve element to its closed position in the fashion inherent to valves which open in opposition to a fluid stream and, conversely, close in the direction of flow of such stream. This closing of the valve element will slightly depress the short arm 15 of the lever E and thereby lift the float F a short distance above the position it would normally occupy when supported on the surface of the water G.

When it is desired to effect discharge of the water from the tank, the lever H is depressed to elevate the arm L and thereby lift the tank ball I from its seat, thereby opening the outlet J and causing the water to flow from the tank and effect the flushing action, all in the usual manner. Elevation of the arm L acts through link 23, lever 20, and link 22 to effect positive downward movement of the end portion 18 of the lever E thereby causing the other end portion 15 thereof to lift and open the valve element D against the water pressure in the valve chamber a. Water from the supply pipe d will then flow into the tank B through the valve opening 8 and the pipe 24 to effect refilling of the tank B when the tank ball I is reseated. During the tank refilling operation the valve element D will be maintained in its open position by the combined action of the velocity flow of water against the underside of the valve element D and the leverage action of the float F on the lever E. When the water level G elevates the float F as before described its leverage action due to the weight thereof tending to hold the valve element D open ceases and is reversed so as to effect partial closing of the valve D so that it will be quickly advanced to its closed position by water pressure as before stated.

In the modified form of the invention shown in Fig. 5 actuation of the float lever E to effect opening of the valve element D is effected automatically on discharge of the water from the tank B and is accomplished by means of a weight W here shown as attached at its upper end to the under side of the float F by a link 25.

The weight W may be of any suitable construction but is here shown as comprising a shell 26 forming a hollow structure containing a quantity of liquid 27. However the weight is essentially characterized by being only slightly heavier than the water it displaces, so that it will hang suspended in the water when completely submerged therein so as to then exert only a slight downward pull on the float, yet is sufficiently heavy when unsubmerged or partly so as to operate through the lever E to open the valve D against the water pressure imposed thereon.

When the tank B is empty or nearly so the weight W is suspended from the float F as indicated by the dotted lines j in Fig. 5 and being unsubmerged or partly so exerts a downward pull on the float F and the float lever E so as to hold the valve element D in its open position. When the water level in the tank raises to a point such as to submerge the weight W it becomes sufficiently buoyant so as to impose no appreciable load on the float F thereby permitting the latter to float upwardly and swing the lever E to initiate closing of the valve element D as shown in full lines in Fig. 5.

On initial discharge of water from the tank, the float F will momentarily remain suspended since its weight is insufficient to open the valve element D, but when the water level falls to a point where the weight becomes unsubmerged or nearly so the weight W will impose such a load on the float F as to pull the latter downward and thereby effect initial opening of the valve element D to recharge the tank as before described.

While I have shown and described specific embodiments of my invention I do not limit myself to the exact details of construction set forth, and the invention embraces such changes, modifications and equivalents of the parts and their formation and arrangement as come within the purview of the appended claims, and while the invention has been set forth as applied to a toilet flush tank it is not thereby limited to such use, since it is applicable for employment with other tanks or reservoirs designed to be equipped with a float controlled supply valve.

I claim:

1. In a ball cock for flush tanks embodying a valve housing, an upwardly opening and downwardly closing poppet valve element in said housing normally closed by water pressure within said housing, a float, and a lever having a long arm to which said float is attached and having a short arm engaging said valve element arranged to effect opening of said valve element on downward movement of said float and long arm; means for imposing a downward pull on said long arm supplementing said float to initiate opening of said valve.

2. In a ball cock for flush tanks embodying a valve housing, an upwardly opening and downwardly closing poppet valve element in said housing normally closed by water pressure within said housing, a float, and a lever having a long arm to which said float is attached and having a short arm engaging said valve element arranged to effect opening of said valve element on downward movement of said float and long arm; means for imposing a downward pull on said long arm supplementing said float to initiate opening of said valve including a manually operable lever, and connections between said lever and said long arm.

3. The structure called for in claim 2 in which the connections comprise an arm connected to said lever, a rocker arm, a link connecting said arms, and a link connecting said rocker arm and the long arm of said float lever.

4. In a ball cock for flush tanks embodying a valve housing, an upwardly opening and downwardly closing poppet valve element in said housing normally closed by water pressure within said housing, a float and a lever having a long arm to which said float is attached and having a short arm engaging said valve element; a supplemental submergible weight which when at least partly unsubmerged in water in the tank will impose a load on said float and lever sufficient to lift said valve element in opposition to the water pressure imposed thereon.

5. In a ball cock, the combination with a tank and a valve controlling the flow of water to said tank, a float, a lever to which said float is attached, and connections between said lever and valve for opening the latter when said float moves downwardly, of a supplemental submergible weight arranged to impose a downward pull on said lever and float when unsubmerged in water in said tank such as to move said float downward and when submerged imposing no appreciable load on said lever and float; said weight being but slightly heavier than the water it displaces.

References Cited in the file of this patent

UNITED STATES PATENTS

| | | |
|---|---|---|
| 418,162 | Cahill | Dec. 31, 1889 |
| 461,439 | King | Oct. 20, 1891 |
| 1,217,183 | Jackson | Feb. 27, 1917 |
| 1,560,867 | Shetka | Nov. 10, 1925 |
| 1,842,715 | Collison | Jan. 26, 1932 |